(12) United States Patent
Réau et al.

(10) Patent No.: US 11,867,297 B2
(45) Date of Patent: Jan. 9, 2024

(54) CLAMPING A PLUG TIP IN A CONTROL VALVE

(71) Applicant: Dresser, LLC, Houston, TX (US)

(72) Inventors: Aurélien Thomas Jules Réau, Flers (FR); Romain Francois Pierre Chenu, Condé en Normandie (FR); Keith Meneses, Andover, MA (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/745,951

(22) Filed: May 17, 2022

(65) Prior Publication Data

US 2023/0375091 A1    Nov. 23, 2023

(51) Int. Cl.
*F16K 1/48* (2006.01)
*F16K 1/38* (2006.01)
*F16K 1/54* (2006.01)
*F16K 3/02* (2006.01)

(52) U.S. Cl.
CPC ............... *F16K 1/482* (2013.01); *F16K 1/38* (2013.01); *F16K 1/54* (2013.01); *F16K 3/0281* (2013.01); *F16K 2200/30* (2021.08)

(58) Field of Classification Search
CPC .... F16K 3/0281; F16K 2200/30; F16K 1/482; F16K 1/38; F16K 1/54
USPC .................. 251/120–127, 360–363
See application file for complete search history.

(56) References Cited

U.S. PATENT DOCUMENTS

| | | | | |
|---|---|---|---|---|
| 1,236,939 A * | 8/1917 | Huber | ............... | F16K 1/487 |
| | | | | 251/86 |
| 1,763,486 A * | 6/1930 | Strong | ............... | F16K 1/422 |
| | | | | 251/360 |
| 1,793,825 A * | 2/1931 | Pope | ............... | F16K 1/36 |
| | | | | 251/357 |
| 3,572,633 A * | 3/1971 | Gaffney | ............... | F16K 1/487 |
| | | | | 251/356 |
| 4,815,698 A * | 3/1989 | Palmer | ............... | F16K 1/482 |
| | | | | 251/85 |
| 7,363,941 B2 | 4/2008 | Caprera | | |
| 9,316,321 B2 * | 4/2016 | McCarty | ............... | F16K 1/36 |
| 2009/0049671 A1 * | 2/2009 | O'Hara | ............... | F16K 1/48 |
| | | | | 29/213.1 |
| 2009/0302258 A1 * | 12/2009 | Haines | ............... | F16K 1/482 |
| | | | | 29/890.121 |

OTHER PUBLICATIONS

Product manual, "Masoneilan 74000 Series Erosion Resistant Control Valves" (2021).

* cited by examiner

*Primary Examiner* — John Bastianelli
(74) *Attorney, Agent, or Firm* — Paul Frank + Collins P.C.

(57) ABSTRACT

A plug assembly that is configured to secure a plug tip to a valve stem. These configurations may include a clamp that secures to an end of the valve stem. The clamp encloses at least part of the plug tip. In one implementation, the design may include a spring assembly that generates a pre-load on the top of the plug tip, as well. The clamp is useful because it accommodates plug tips made from ceramics and like, brittle materials. Its features can prevent certain mechanical failure, for example, cracks or breaks that can occur during manufacture or assembly. As an added benefit, the device can maintain alignment of the plug tip with the valve stem. This feature can ensure proper engagement with a seat in a flow control, like a control valve.

10 Claims, 5 Drawing Sheets

CLAMPING A PLUG TIP IN A CONTROL VALVE

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. These devices may include control valves, which provide active control of flow, through an exchange of control signals with a central control network. In oil and gas facilities, operators may deploy control valves to control flow of debris-entrained fluids that often flow at high temperature and high pressure. These conditions are known to rapidly erode parts subject to the flow. Valve manufacturers may produce these parts from materials, like ceramics, to counteract abrasive effects of the fluids and, in turn, reduce or slow corrosion or erosion in service.

SUMMARY

The subject matter of this disclosure relates to improvements to valve manufacture or construction that elongate service life of parts in these corrosive environments. Of particular interests are embodiments with a mechanism to secure parts in a control valve (or other flow control). These embodiments may simplify assembly, for example, by eliminating the need to use high torque to tighten or secure parts in position. This feature may ensure better alignment, account for tolerance stack-up, and allow for manufacture of parts with appropriate materials to avoid mismatch in thermal expansion or to slow the rate at which such parts may degrade in service. An underlying benefit, of course, is to reduce costs to replace or repair devices in the field.

DRAWINGS

This specification refers to the following drawings.

Figure 1:
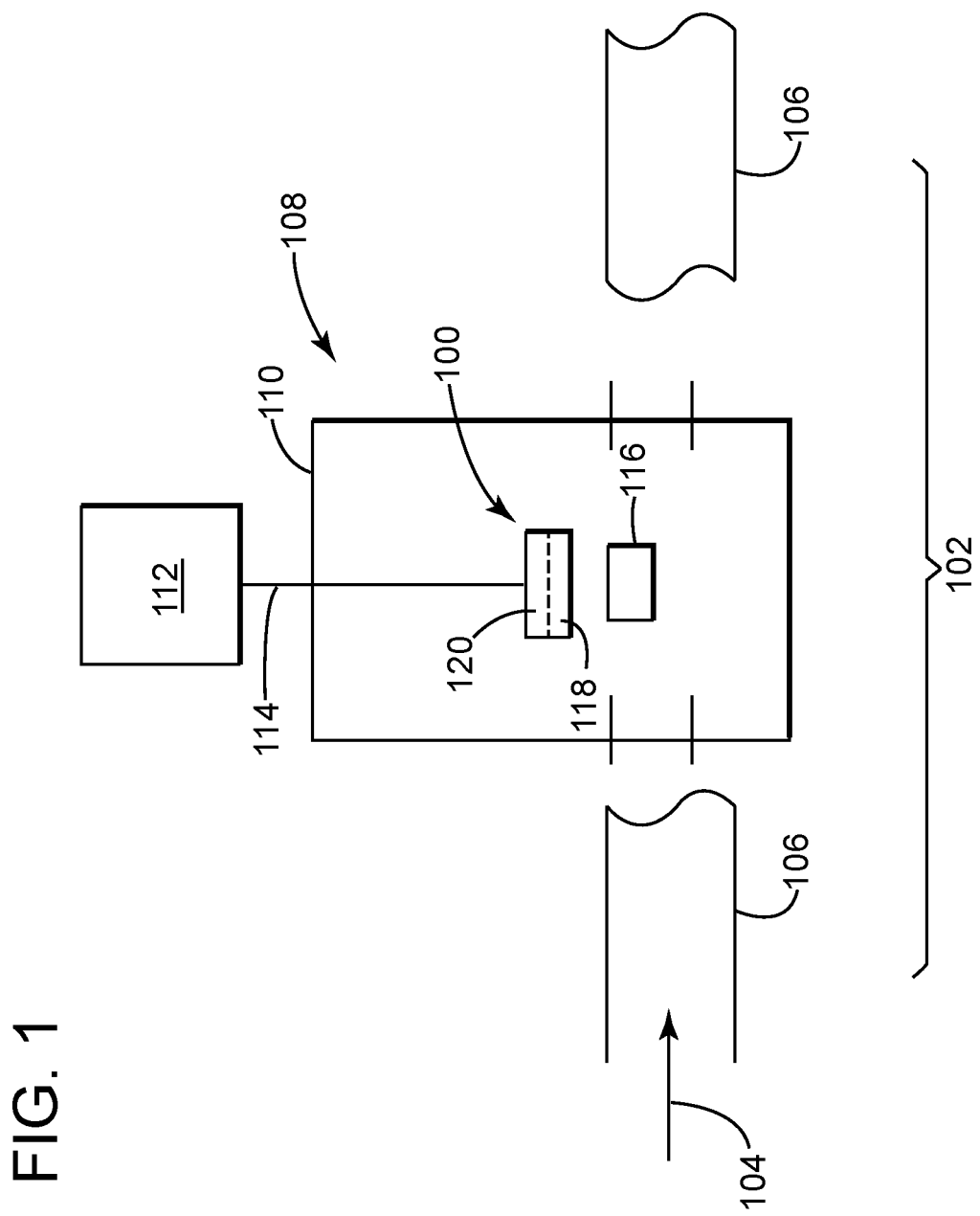
FIG. 1 depicts a schematic diagram of an exemplary embodiment of a plug assembly 100.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. The examples may utilize ceramics because these materials have properties that are well-suited for use in flow control of caustic or erosive fluids. Valve components made of ceramics, for example, are particularly hearty, offering long service life under conditions (like, high temperature and high pressure) that might prevail in oil & gas applications. However, although they exhibit robust properties, parts made out of these materials are inherently brittle and can break in use or at the time of manufacture. The designs herein are meant to address the brittle nature of these parts. Other embodiments are within the scope of this disclosure.

FIG. 1 depicts an example of a plug assembly 100. This example is found in a distribution network 102, typically designed to carry material 104 through a network of conduit 106. The plug assembly 100 may be part of a flow control 108 that has a valve body 110 to connect in-line with the conduit 106. The device may also have actuator 112. A valve stem 114 may extend from the actuator 112 to locate the plug assembly 100 in position proximate a seat 116. In one implementation, the plug assembly 100 may include a plug tip 118 and a clamp 120.

Broadly, the plug assembly 100 may be configured for use in highly erosive flow. These configurations may include devices that can regulate flow, for example, as part of a valve that modulates fluids in a process. Design of the devices may slow wear that can occur due to properties of the flow or conditions (like high temperature or high pressure) that prevail in the process. This design may integrate materials, like ceramics, that are highly resistant to corrosion or erosion. As an added benefit, the design may incorporate parts or features to accommodate physical properties of these materials, including the brittleness that can lead to part damage or failure.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast or machined metals. This structure may form a flange at openings I, O. Adjacent pipes 106 may connect to these flanges. The actuator 112 may use compressed or pressurized air and, along with a piston, spring (or springs), or a flexible diaphragm, generate a load. The valve stem 114 may form an elongate cylinder or rod that directs this load to the regulate flow of material 104 through an opening in the seat 116.

The plug tip 118 may be configured to prevent flow through the seat 116. These configurations may include devices that reside in the path of flow. These devices may move relative to the seat 116. In one implementation, the device may comprise ceramic(s) or have surfaces in the path of flow that are made from ceramic. This feature can lengthen service life because, as noted herein, ceramic and like materials tend to resist erosion and corrosion that is consistent with fluid flow, particularly in hydrocarbon (oil & gas) industry.

The clamp 120 may be configured to receive the plug tip 118. These configurations may include devices that can secure the plug tip 118 to other parts of the valve, including the valve stem 114. The devices may employ mechanisms that reduce or avoid stress seen at the ceramic tip. This feature can avoid damage that might require repair or replacement of the plug tip in the control valve. These mechanisms may also provide superior alignment of the plug tip 118 on the valve stem 114, particularly at temperatures as high as 500° C.

Figure 2:
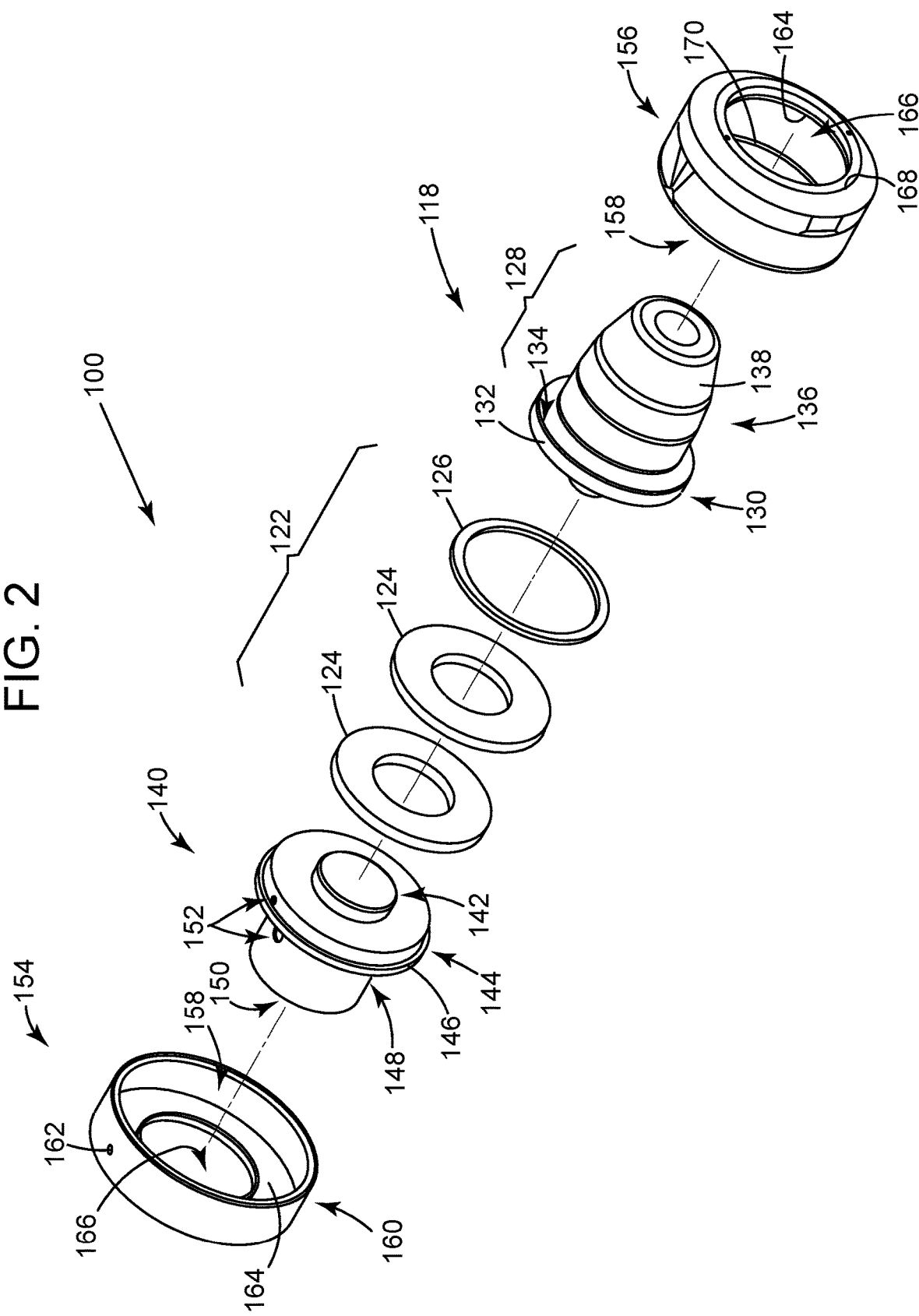
FIG. 2 depicts a perspective view of an example of structure for the plug assembly 100 of FIG. 1.

FIG. 2 depicts a perspective view of an example of structure for the plug assembly 100 of FIG. 1 in exploded form. This example includes a load assembly 122 that can generate a pre-load. The load assembly 122 may use springs 124 for this purpose. Constant force springs, conical springs, or disc springs, like Belleville washers, may provide sufficient force in an appropriately sized package for use in this device. A load bearing member 126 may insert between the springs 124 and the top of the plug tip 118. This part may comprise one or more flat or plain washers, preferably made of steel or stainless steel to alleviate bearing stress. The washer 126 may reside on top of the plug tip 118, shown here to have a generally, cylindrical plug body 128 with a top shoulder portion 130 that has an outer surface 132 with a tapered section 134. The plug body 128 may have a diameter that decreases from the tapered section 134 to a plug portion 136. The diameter may also change in the plug portion 136, preferably to provide its outer surface 138 with geometry for the plug portion 136 to interface and seal with the seat 116 (FIG. 1).

The plug assembly 100 may also include parts that secure the plug body 128 to the valve stem 114 (FIG. 1). These parts may include a stem adapter 140 with a boss 142 having a diameter to receive the springs 124 thereon. The boss 142 may terminate at a shoulder 144 that increases in diameter to create a step 146. The stem adapter 140 may then reduce in diameter to form a boss 148. A bore 150 may penetrate from the top of the stem adapter 140 into the boss 148. The stem adapter 140 may also include cross-wise apertures 152 that are perpendicular to the bore 150. As also shown, the plug assembly 100 may include a pair of clamp members 154, 156. These parts may enclose the springs 124 and the washer 126, as well as secure the plug body 128 to the stem adapter 140. The clamp members 154, 156 may have a large bore 158 that forms a thin, peripheral wall 160 with a cross-wise aperture 162. The large bore 158 may terminate at a bottom wall 164. A central opening 166 may penetrate the bottom wall 164. The central opening 166 on the "lower" clamp member 156 may include a tapered section 168 and its peripheral wall 160 may include a step portion 170.

Figure 3:
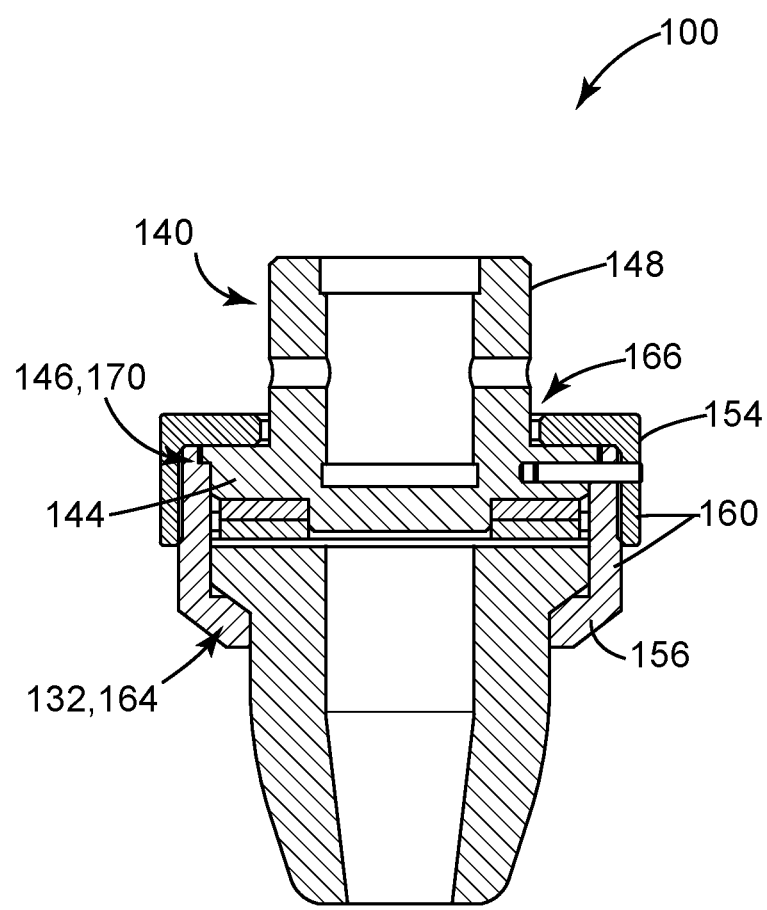
FIG. 3 depicts an elevation view of the cross-section of the structure of FIG. 2 in assembled form.

FIG. 3 depicts an elevation view of the cross-section of the structure of FIG. 2 in assembled form. The central opening 166 on the "upper" clamp member 154 may insert onto the boss 144 of the stem adapter 140. The plug body 128 may insert into the central opening 166 of the lower clamp member 156. The peripheral wall 160 on the lower clamp member 156 may fit into the large bore 158 on the upper clamp member 154. In one implementation, complimentary threads on the peripheral wall 160 allow a technician to screw the clamp members 154, 156 together, for example, until the step portion 170 contacts the step 146 on the shoulder 144 of the stem adapter 142. The design may adopt a diameter for the shoulder 144 and the large bore 158 on the lower clamp 156 as a close or "snug" fit. This feature can ensure proper alignment of the plug body 128 on the valve stem 114 (FIG. 1). The tapered surfaces 132, 164 create an interface that is also useful to maintain alignment and control tolerance stack-up, as well. This interface creates a "cone line" contact. In one example, the tapered surfaces 132, 164 meet at a cone angle of about 35°, which can force the plug body 128 downward, into the central opening 166 of the lower clamp member 156 in response to thermal expansion.

Figure 4:
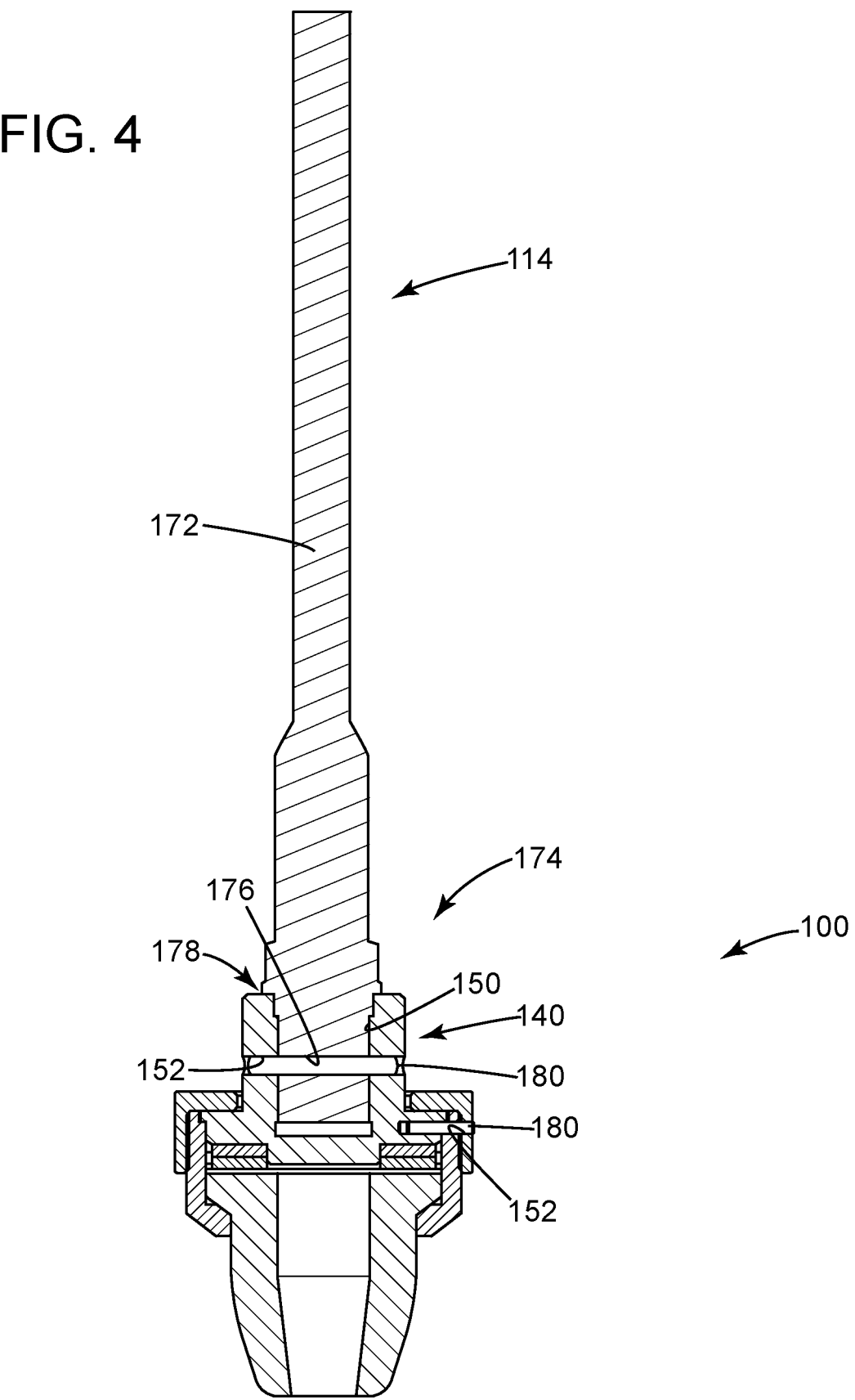
FIG. 4 depicts an elevation view of the cross-section of an example of the structure of FIG. 3.

FIG. 4 depicts an elevation view of the cross-section of an example of the structure of FIG. 3. The valve stem 114 may embody an elongate, cylindrical rod 172 with an end 174 that inserts into the bore 150 of the stem adapter 140. The end 174 may include a cross-wise aperture 176. In one implementation, assembly may require a technician to first locate the upper clamp 154 onto the stem adapter 140, and then assemble the stem adapter 140 onto the rod 172. A weld 178 may secure the stem adapter 140 onto the rod 172. The weld 178 may fully circumscribe the diameter of the rod 172; however, other configurations of the weld material may prevail as well. A first pin 180 may insert into the cross-wise aperture 152, 176 to provide additional secure engagement of these pieces. The technician may then locate the springs 124, the washer 126, the plug body 128, and the lower clamp 156. In one example, a load L may find use to compress the springs 124. The technician may use a press (or like device or fixture) to generate this load. This feature can foreclose the need for the technician to apply high torque to thread the clamps 154, 156 together, which can avoid twisting or relative movement of the parts that can lead to misalignment of the plug body 128 with the axis of the rod 172. A second pin 182 may reside in the cross-wise aperture 152 on the clamp members 154, 156 as well. The second pin 182 may extend into the stem adapter 140 to prevent separation or inadvertent removal of the clamp members 154, 156, for example, by a technician.

Figure 5:
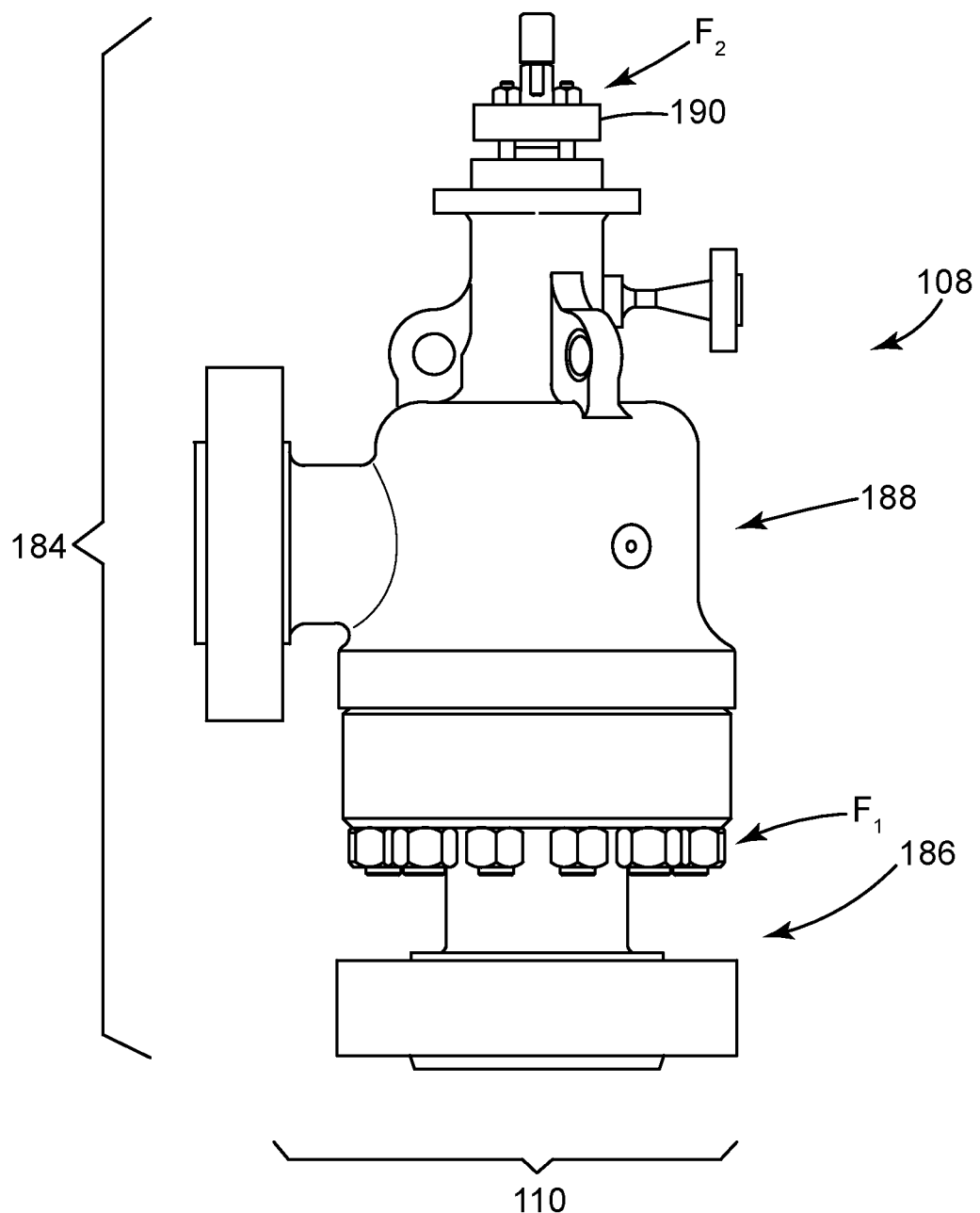
FIG. 5 depicts an elevation view from the side of an example of structure for a flow control.

FIG. 5 depicts an elevation view of an example of structure for the flow control 108 of FIG. 1. This example include a valve body 110 made from a casting or forging 184. In one implementation, the casting 184 may have more than one part, including a flange 186 and a body 188, which secure to one another with fasteners $F_1$. The elongate rod 172 may extend out of the body 188. A packing flange 190 may secure to the top part 186, for example, with fasteners $F_2$. The packing flange 188 may maintain position of certain packing material that resides inside of the body 186. The packing material may prevent leaks or fugitive emissions that might emanate from around the elongate rod 172.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:
1. A valve, comprising:
a valve stem; and
a plug assembly coupled to the valve stem, the plug assembly comprising a plug tip and a clamp, the clamp comprising:

a stem adapter coupled to an end of the valve stem, the stem adapter having a shoulder with a first side and a second side, the stem adapter forming a first boss on the first side with a bore that receives the end of the valve stem;

a spring assembly disposed on the second side of the shoulder;

an upper clamp with a first peripheral wall and a first opening that receives the first boss; and a lower clamp with a second peripheral wall and a second opening that receives the plug tip, wherein portions on the first peripheral wall and the second peripheral wall that couple to one another to clamp at least part of the plug tip to cause the spring assembly to generate a pre-load.

2. The valve of claim 1, further comprising:

a washer disposed between the spring assembly and the plug tip.

3. The valve of claim 1, wherein the spring assembly comprises a pair of constant force springs disposed between the stem adapter and the plug tip.

4. The valve of claim 1, wherein the spring assembly comprises a pair of conical springs disposed between the stem adapter and the plug tip.

5. The valve of claim 1, further comprising:

a pin that extends through the upper clamp and the lower clamp.

6. The valve of claim 1, further comprising:

a pin that extends through the upper clamp into the stem adapter.

7. The valve of claim 1, wherein the first peripheral wall and the second peripheral wall have corresponding threads.

8. The valve of claim 1, wherein the stem adapter and the lower clamp contact one another.

9. The valve of claim 1, wherein the lower clamp and the plug tip contact one another on a tapered surface.

10. The valve of claim 1, further comprising:

a weld around the valve stem.

* * * * *